Aug. 7, 1934.  C. R. HUBBARD  1,969,008
MACHINERY PACKING
Filed Dec. 29, 1932
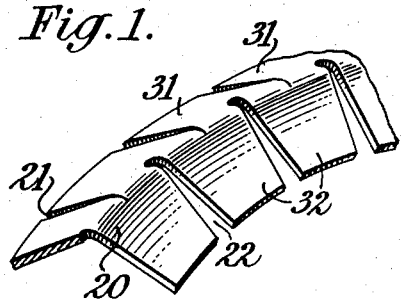
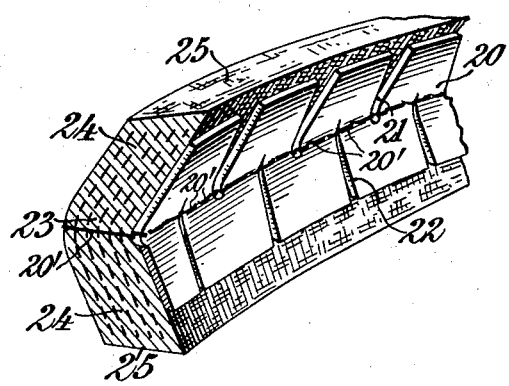
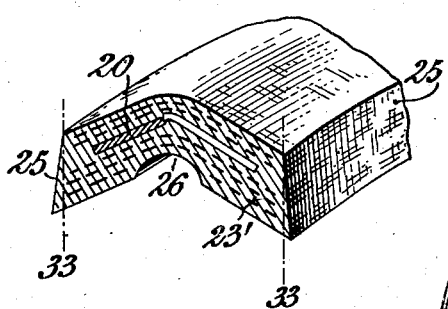
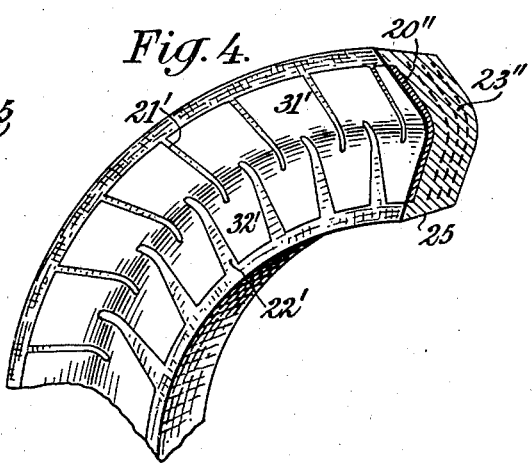
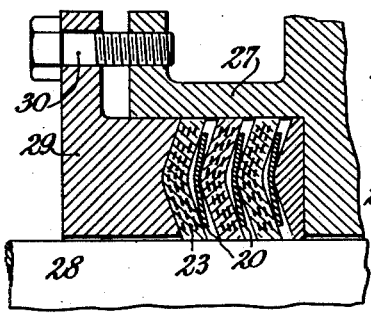
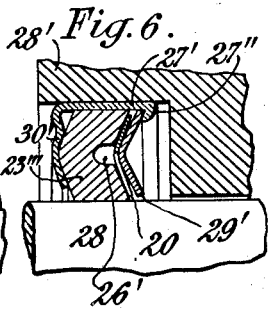
INVENTOR
Cecil R. Hubbard
BY Fraser, Myers
& Manley
ATTORNEYS.

Patented Aug. 7, 1934

1,969,008

UNITED STATES PATENT OFFICE 1,969,008

MACHINERY PACKING

Cecil R. Hubbard, Palmyra, N. Y., assignor to The Garlock Packing Company, Palmyra, N. Y., a corporation of New York Application December 29, 1932, Serial No. 649,255

7 Claims. (Cl. 288—1)

This invention relates to improvements in machinery packing adapted for use either in the sealing of joints against fluid pressure or as a means of preventing the escape of lubricant and the introduction of dust and other foreign matter at the joint between relatively movable parts of a machine separated by a lubricated bearing.

It is an object of the invention to provide an efficient packing comprising an improved sealing element and expander in combination.

In the accompanying drawing illustrating preferred forms of the invention,—

Figure 1 is a perspective view of a fragmentary portion of a packing expanding element comprising one element of the invention to be disclosed and claimed.

Fig. 2 is a view, partly in perspective and partly in cross-section, illustrating an improved packing comprising a fluid-sealing element and the expander shown in Fig. 1 in combination.

Fig. 3 is a similar view of a modified form of packing, the expanding element being indicated as having been embedded within the body portion of the sealing element.

Fig. 4 is a similar view of which the expanding element is represented as having been embedded in the inner surface of the sealing element, the parts being indicated as of circular form.

Fig. 5 is a conventional view in cross-section of a portion of a stuffing-box and a number of elements of packing embodying the invention in modified form, the packing being indicated as having been assembled in the box in readiness to be drawn into its fluid-sealing relation by advancing the gland.

Fig. 6 is a cross-sectional view of an oil-sealing device embodying the invention in a form in which the resilient expanding element need not necessarily be attached to the flexible sealing element.

As best represented in Fig. 1 the improved packing expanding element 20 comprises a strip of thin resilient metal severed at its opposite edges as at 21, 22, to increase its resiliency and produce a spring-like structure and preferably bent into a trough-like structure the cross-section of which is in the form of a letter V with its legs widely opened and the angle between the legs preferably rounded.

As indicated in Fig. 2 the expanding element 20 may be combined with a fluid-sealing element 23 of any appropriate packing material, preferably of friction fabric comprising fibrous material and rubber composition or other suitable non-metallic or semi-plastic material. It might even be constructed of one of the various metals which have commonly been used in the making of machinery packings. In its preferred form the sealing element 23 may comprise a structure having a cross-section of the shape of a letter V with its legs 24 widely opened and terminating with oppositely-disposed surfaces 25 adapted to serve as sealing faces. If desired, the sealing element 23 may be firmly secured to the expanding element 20 by any suitable attaching medium such as cement, or stitching 26, or the two parts may be firmly united during the process of vulcanization; and the dimensions and form of the composite packing should be such that the legs 24 of the sealing element and the marginal portions of the expanding element 20 will have to be slightly flexed so as to reduce the width of the packing element when it is assembled with the parts of the machine with which it is used. Due to this adjustment of the form and dimensions of the packing as compared with those of the device to be sealed by the packing, the faces of the sealing element are held in snug contact with the surfaces of the parts to be sealed by means of the flexed expanding element.

In the form of the invention illustrated in Fig. 3 the expanding element 20 is embedded within the body portion of the sealing element 23', which differs from that illustrated in Fig. 2 only in that it is provided with an internally-disposed groove 26 to produce a zone of weakness along the center line of the packing adapted to serve as a hinge-like joint between the two marginal portions. When applying the invention to a packing of this form the packing should be molded and vulcanized in a form such that it will have to be flexed slightly about its central line in order to assemble it with the parts of the device with which it is used.

The form of the invention illustrated in Fig. 4 differs from those hereinbefore described in that the spring-like expanding element 20'' is embedded within the inner or hollowed surface portion of the sealing element 23'', thus providing a somewhat more reliable attachment between the parts than may be secured by the surface attachment represented in Fig. 2.

It is not essential that the expanding element be attached or secured to the sealing element in any manner. In Fig. 5 is illustrated by way of example one use of the expanding element in association with a separate and independent sealing element. In this figure the packing is conventionally represented in cross-section in its assembled relation with a stuffing-box 27 surrounding an element 28 which may be representative of either a piston rod or a journal bearing and a gland 29 which, by means of machine screws or other appropriate fastening devices one of which is shown at 30, may be advanced to compress the sealing elements 23 and expanding elements 20 in the stuffing-box.

In the form of the invention illustrated in Fig. 5 the parts of the sealing elements may be disposed at an angle of less magnitude with respect to each other than are those of the expander element so that their normal form will correspond with that indicated in the drawing, or they may be of the same angular relation with respect to each other but of a normal depth greater than that of the space within the stuffing-box in which they are to be used. In either case, when assembled, the angular relations will be substantially as represented in the drawing. When thus assembled, on drawing up the gland by means of the screws 30 the sealing elements and expanding elements will be drawn together, as a result of which the expanding elements will cause the inner and outer surface portions of the sealing elements to be held under compression in snug contact with the surfaces of the parts to be sealed.

In Fig. 6 is illustrated a form of the invention adapted for use as an oil-sealing device. It comprises a relatively soft and flexible sealing element 23''' and a resilient metal, spring-like expander 20, which may be held in a state of confinement between a flange 30' of an annular housing ring 27' and a confining ring 29' which may be relatively rigid as compared with the resilient spring-like expander. The confining ring need not be an integral portion of the housing but may, as shown, be a separate ring secured within the cylindrical portion of the housing by an inturned retaining flange 27'' and may be regarded as an inward extension of the flange. The oil-sealing device thus constructed is adapted to be mounted as a unit in the annular space between two relatively movable members, such, for example, as a rotatable shaft 28 and a surrounding bearing element 28', parts only of which are shown in Fig. 6.

The dimensions and relative proportions of the parts of the oil-sealing device of the form illustrated by Fig. 6 should preferably be such that the confining ring 29' will make contact with the expander intermediate its inner and outer peripheries, and such that the zones of greatest pressure between the expander and the sealing element will be along their inner and outer peripheries. The sealing element should preferably be of the form illustrated having the annular recess or channel 26' to provide a zone of weakness about which its inner and outer undercut sealing lips may be flexed. The space between the confining ring and the flange 30' should be sufficiently restricted to cause the expander 20 to be flexed by the opposing pressures of the lips of the sealing ring 23'' and the confining ring 29' between which it is confined, so that the inner and outer peripheral portions or lips of the sealing element will be expanded as a result of a toggle-like action of the intervening part of the sealing ring and held in a state of compression against the opposing surface portions of the shaft 28 and the housing 27'.

Obviously the outer surface of the housing 27' and the inner surface of the bearing element 28' should be so dimensioned and fitted as to form an oil-tight joint.

In any of the forms of the packing herein disclosed the parts may be either manufactured in rectilinear form and then bent to spiral form of a curvature substantially conforming with that of the parts of the machine with which the packing is to be used, or they may be initially made in the form of rings of the desired curvature, a portion of such a ring being illustrated in Fig. 4.

The severing of the material of the expander element along its opposite edges to form the tabs 31, 32 may be effected by means of notches 21, 22, as indicated in Fig. 1, or, if desired, the outer series of tabs may, as indicated in Fig. 4, be separated by narrow cuts or slits 21', the inner series 32' being separated by notches 22' to provide for the bending of the material from straight to circular form.

The expanding element may be made of brass, spring steel, phosphor-bronze, or any other material having the required strength and resiliency. Preferably the normal form of the packing as indicated in Fig. 3 should be such that its sealing surfaces 25 will be inclined at a slight angle, as indicated by the two parallel broken lines 33, in order that, when compressed between the surfaces of the part to be sealed, they may more readily be caused to make true and perfect contact.

The packing, when installed, will be held in a flexed condition and the resilient expander will constantly tend to flatten the concave portion of the flexible sealing ring and hold the adjacent marginal portions of its sealing surfaces in snug contact with the parts to be sealed with a toggle-like action.

The invention is not intended to be limited to any of the specific forms herein disclosed for purposes of illustration but should be regarded as including modifications and variations thereof within the scope of the appended claims.

What is claimed is:

1. A machine packing adapted for use as an oil-sealing device, said packing comprising, in combination, a flexible sealing ring having outer and inner substantially cylindrical sealing faces and intervening, oppositely-disposed lateral surfaces, one of said lateral surfaces being slightly concave so as to gently undercut the adjacent margins of the sealing surfaces, whereby a flattening of the concave face of the ring will cause the marginal portions of the sealing faces to be held in close contact with the opposed surfaces of the parts to be sealed with a toggle-like action, and a thin metal expanding ring having its marginal portions in contact with the undercut marginal portions of the sealing ring and comprising an annular series of united, resilient, laterally-disposed fingers each adapted to yield independently of the others, the dimensions and normal forms of the two rings being such that, when installed and held in an assembled relation, the sealing ring, if its sealing surfaces were not constrained would be flattened by the resilient metal ring and thereby expanded radially to an extent such that its depth would be greater than that of the annular space within which it is intended to be used.

2. A packing, as defined by claim 1, of which the expanding element is embedded in the material of the sealing element.

3. A machine packing adapted for use as an oil-sealing device, said packing comprising, in combination, a flexible sealing ring having outer and inner substantially cylindrical sealing faces and intervening, oppositely-disposed lateral surfaces, one slightly concave and the other slightly convex, whereby a slight flattening of the ring will cause the sealing faces to be pressed into close contact with the opposed surfaces of the parts to be sealed with a toggle-like action, a thin metal expanding ring of a cross-sectional form approximating that of the concave surface of the sealing ring and comprising an annular series of united, resilient, laterally-disposed fingers each adapted to yield independently of the others, and means to hold said rings in an assembled relation with the convex surface of the expanding ring directed towards the concave surface of the sealing ring and with their inner and outer marginal portions in contact, the holding means including means to oppose relative movement away from each other of the zones of said rings intermediate their contacting marginal portions, the dimensions and normal forms of the rings being such that the sealing ring, when not constrained by the surfaces of the parts to be packed, will be slightly flattened by the resilient metal ring and its sealing surfaces expanded to an extent such that its radial depth will be greater than that of the annular space within which it is intended to be used.

4. A machinery packing comprising a sealing ring of flexible material having undercut outer and inner sealing lips, a resilient spring-like expanding ring of trough-like cross-sectional form with its marginal portions in contact with the undercut portions of the lips of the sealing ring and its intervening portion extending into the intervening portion of the recess formed by undercutting the lips of the sealing ring, a confining ring in contact with an annular zone of the expanding ring intermediate its marginal portions at the surface opposite that which faces the sealing ring, the confining ring being relatively rigid as compared with the flexible, spring-like expanding ring and means to hold the expanding ring flexed between the lips of the sealing ring and the opposed confining ring to an extent such as to maintain a sealing pressure between the lips of the sealing ring and the surfaces with which they make contact when in use.

5. A machinery packing comprising a relatively rigid housing element having a cylindrical portion and a pair of inturned spaced flanges, a flexible sealing ring having an annular portion in contact with one of the flanges of the housing element and a pair of spaced marginal sealing lips separated by an annular recess in the face of the sealing ring directed away from the contacting flange, and a resilient expanding ring of trough-like cross-sectional form nested in the recess of the sealing ring with its marginal portions in contact with the undercut portions of the sealing lips, the spacing and form of the housing flanges being such as to cause the expanding ring to be held flexed between the lips of the sealing ring and a portion of one of the housing flanges in contact with its outer surface along an annular zone intermediate its marginal portions.

6. A machine packing adapted for use as an oil-sealing device, said packing comprising, in combination, a flexible sealing ring having outer and inner substantially cylindrical sealing faces and intervening, oppositely-disposed lateral surfaces, one slightly concave and the other slightly convex, whereby a slight flattening of the ring will cause the sealing faces to be pressed into close contact with the opposed surfaces of the parts to be sealed with a toggle-like action, a thin metal expanding ring of a cross-sectional form approximating but slightly flatter than that of the concave surface of the sealing ring and comprising an annular series of united, resilient, laterally-disposed fingers each adapted to yield independently of the others, and means to hold said rings in an assembled relation with the convex surface of the expanding ring directed towards the concave surface of the sealing ring and with their inner and outer marginal portions in contact, the holding means including means to press the zones of the two rings intermediate their contacting marginal portions towards each other, thus flexing the expanding ring and causing it to tend to flatten the sealing ring.

7. A machinery packing substantially like that defined by claim 1, of which the sealing ring is channeled along the central portion of its concave face to provide a zone of weakness between the outer and inner portions of the ring.

CECIL R. HUBBARD.